(12) United States Patent
Kottapalli et al.

(10) Patent No.: US 6,898,694 B2
(45) Date of Patent: May 24, 2005

(54) HIGH INSTRUCTION FETCH BANDWIDTH IN MULTITHREAD PROCESSOR USING TEMPORARY INSTRUCTION CACHE TO DELIVER PORTION OF CACHE LINE IN SUBSEQUENT CLOCK CYCLE

(75) Inventors: Sailesh Kottapalli, Milpitas, CA (US); James S. Burns, Cupertino, CA (US); Kenneth D. Shoemaker, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 09/896,346

(22) Filed: Jun. 28, 2001

(65) Prior Publication Data

US 2003/0005262 A1 Jan. 2, 2003

(51) Int. Cl.$^7$ ................................................ G06F 9/48
(52) U.S. Cl. ...................... 712/207; 711/140; 711/213; 712/206; 712/245
(58) Field of Search ................................ 711/140, 213; 712/206, 207, 245

(56) References Cited

U.S. PATENT DOCUMENTS

| | | | | | |
|---|---|---|---|---|---|
| 5,170,476 A | * | 12/1992 | Laakso et al. | ............... | 711/140 |
| 5,317,701 A | * | 5/1994 | Reininger et al. | .......... | 712/207 |
| 5,442,756 A | * | 8/1995 | Grochowski et al. | ....... | 712/238 |
| 5,724,565 A | * | 3/1998 | Dubey et al. | ............... | 712/245 |
| 6,170,051 B1 | * | 1/2001 | Dowling | ..................... | 712/225 |
| 6,237,074 B1 | * | 5/2001 | Phillips et al. | .............. | 711/213 |

* cited by examiner

Primary Examiner—Kenneth S. Kim
(74) Attorney, Agent, or Firm—Ami Patel Shah

(57) ABSTRACT

The present invention provides a mechanism for supporting high bandwidth instruction fetching in a multi-threaded processor. A multi-threaded processor includes an instruction cache (I-cache) and a temporary instruction cache (TIC). In response to an instruction pointer (IP) of a first thread hitting in the I-cache, a first block of instructions for the thread is provided to an instruction buffer and a second block of instructions for the thread are provided to the TIC. On a subsequent clock interval, the second block of instructions is provided to the instruction buffer, and first and second blocks of instructions from a second thread are loaded into a second instruction buffer and the TIC, respectively.

9 Claims, 4 Drawing Sheets

HIGH INSTRUCTION FETCH BANDWIDTH IN MULTITHREAD PROCESSOR USING TEMPORARY INSTRUCTION CACHE TO DELIVER PORTION OF CACHE LINE IN SUBSEQUENT CLOCK CYCLE

BACKGROUND OF THE INVENTION

1. Technical Field

The present invention relates to computer systems and, in particular to mechanisms for fetching instructions for execution by a processor in a computer system.

2. Background Art

Modern high-performance processors are designed to execute multiple instructions on each clock cycle. To this end, they typically include extensive execution resources to facilitate parallel processing of the instructions. The efficient use of these resources may be limited by the availability of instructions that can be executed in parallel. This availability is referred to as instruction level parallelism (ILP). Dependencies between instructions in a thread of instructions can limit ILP.

One strategy for increasing ILP is to allow a processor to execute instructions from multiple instruction threads simultaneously. By definition, instructions from different threads are independent, which allows instructions from different threads to execute in parallel, increasing ILP. A processor that supports concurrent execution of instructions from two or more instruction threads is referred to as a multi-threaded (MT) processor. An MT processor includes resources, such as data, state and control registers, to track the architectural states associated with the different instruction threads as they execute concurrently. In addition, operations such as instruction fetches and state updates, are modified to accommodate concurrent handling of multiple instruction threads.

The fetch engine of a processor is responsible for providing instructions to the execution resources of a processor. The instruction fetch engine and execution resources are components of the front end and back end, respectively, of the processor's execution pipeline. The front and back ends often communicate through an instruction buffer or queue, which decouples their operations. For example, if the back end of the pipeline stalls, the front end may continue fetching instructions into the instruction queue. If the front end of the pipeline stalls, the backend of the pipeline may continue executing instructions accumulated in the instruction queue.

FIG. 1 is a block diagram of a conventional instruction fetch engine for a uni-threaded processor. For the disclosed fetch engine, a multiplexer (MUX) 110 selects an instruction pointer (IP) from one of several inputs 140(1)–140(m) and provides it to an instruction cache 120. If the IP hits in I-cache 120, it provides instructions from the associated entry to an instruction queue 130. The number of instructions provided on each clock interval depends on the particular processor used. For example, VLIW processors may provide blocks of two or more instructions from their I-caches during each clock interval.

FIG. 2 is a block diagram of a conventional instruction fetch engine 200 that has been modified for a multi-threaded processor. Fetch engine 200 includes IP MUXs 210(a) and 210(b), which provide IPs for their respective threads to an arbiter 250. Arbiter 250 forwards an IP to an I-cache 220, which provides a corresponding block of instructions to one of instruction queues 230(a) and 230(b). For example, arbiter 250 may provide IPs from the different threads on alternating clock intervals. One problem with fetch engine 200 is that the bandwidth to instruction queues 230(a) and 230(b) is, on average, half of the bandwidth to instruction queue 130 of uni-threaded processor 100. When queues 230(a) or 230(b) are empty, this reduction in bandwidth translates directly into a lower instruction throughput for the processor.

An alternative to fetch engine 200 that has a smaller impact on the instruction fetch bandwidth provides multiple ports on, for example, I-cache 220 and its various components (tag array, translation look-aside buffers). Multi-ported structures are considerably larger than single ported structures, so the bandwidth gain may significantly increase the die area of a processor.

The present invention address these and other issues associated with instruction fetching in multi-threaded processors.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

Figure 1:
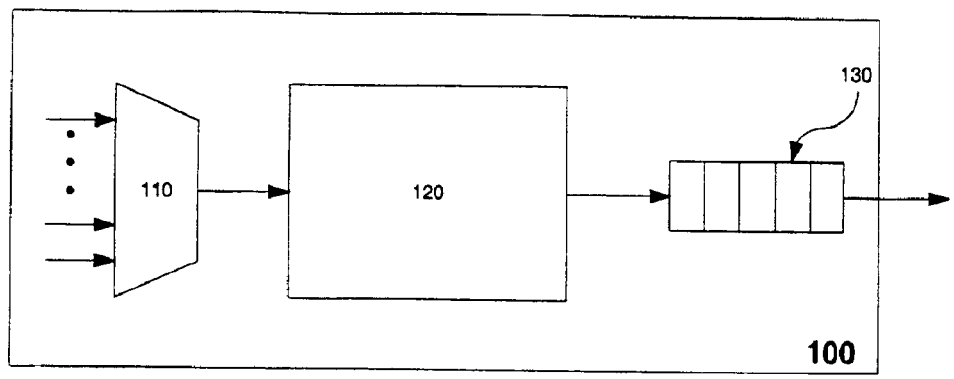
FIG. 1 is a block diagram of a conventional instruction fetch engine for uni-threaded processor.
Figure 2:
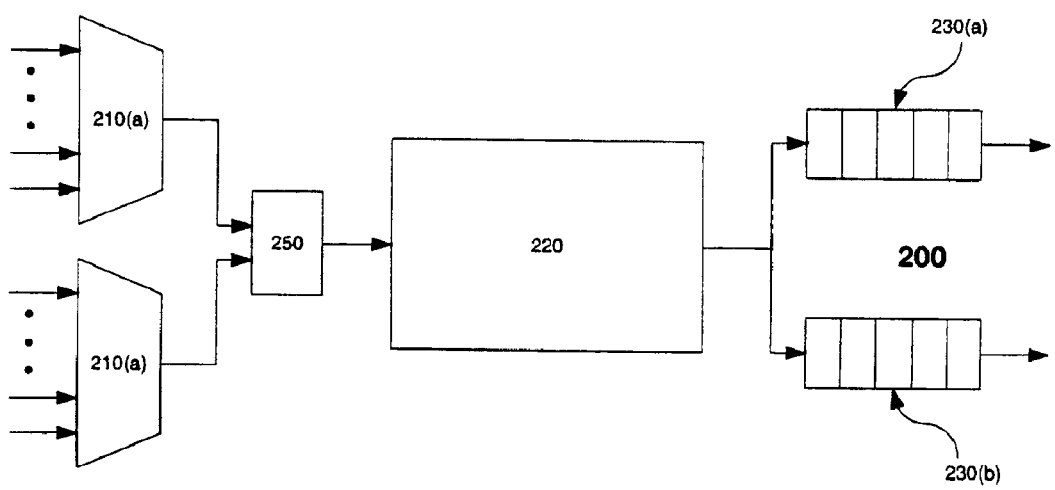
FIG. 2 is a block diagram of a conventional instruction fetch engine for a multi-threaded processor.

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention supports high bandwidth instruction fetching without significantly increasing the die area necessary for the instruction fetch engine. A processor in accordance with the present invention includes a temporary instruction cache that operates in conjunction with an instruction cache. The instruction cache provides a block of instructions in response to an instruction pointer (IP) from an instruction thread. On one clock interval, a first portion of the instruction block is provided to an instruction buffer or queue, and a second portion of the instruction block is provided to the temporary instruction cache. On a subsequent clock interval, the second portion of instruction block is provided to the instruction queue. An instruction block for a different instruction thread may be provided from the instruction cache to a corresponding instruction queue on the subsequent clock interval.

For one embodiment of the invention, a dual threaded processor includes an instruction cache that handles instructions in blocks that are twice as large as the processing width of the processor. Here, processing width refers to the maximum number of instructions that the processor is capable of executing per clock interval. On one clock interval, half of the instruction block is provided to the instruction queue and the other half of the instruction block is provided to the temporary instruction cache. On a subsequent clock interval, the half of the instruction block stored in the temporary instruction cache is provided to the instruction queue.

Other embodiments of the invention may support additional threads by scaling the size of the instruction block provided by the I-cache during a fetch operation and the size of the portions into which the block of instructions is divided. Generally, for a processor having a processor width, $W_P$, and capable of concurrently executing m-threads, the instruction cache provides $m^* W_P$ instructions for a thread when the IP it provides hits in the instruction cache. $W_P$ instructions are provided to an instruction queue allocated to the thread and $(m-1) \cdot W_P$ instructions are provided to the temporary instruction cache. For a processor that implements a round-robin thread-selection algorithm, the latter instructions are transferred from the temporary instruction cache to the allocated instruction queue in blocks of $W_P$ instructions, on the next (m−1) clock cycles, as instructions from the remaining (m−1) threads are provided from the instruction cache to corresponding instruction queues and the temporary instruction cache.

Figure 3:
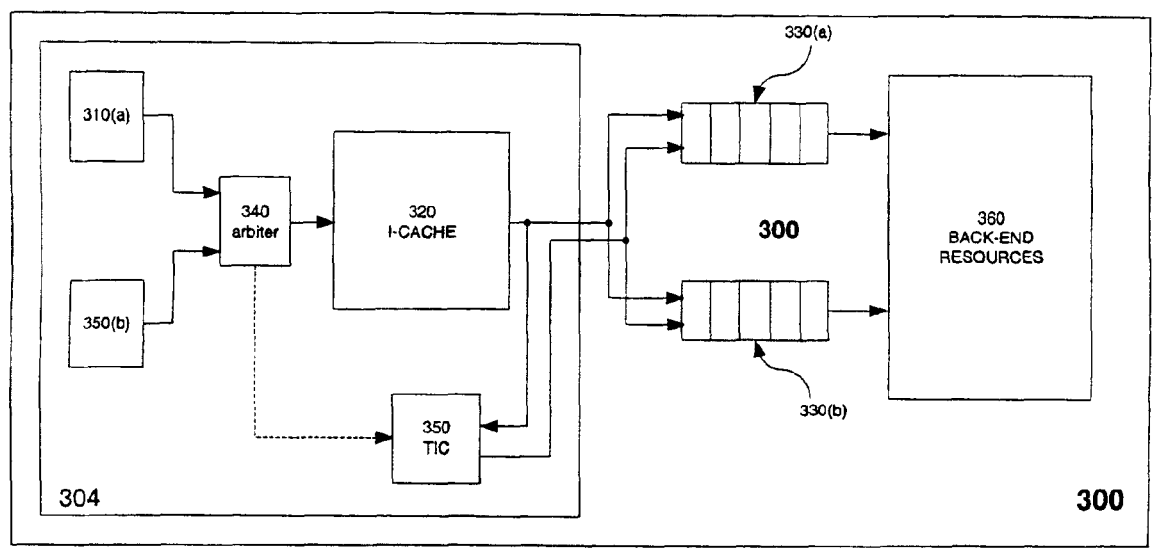
FIG. 3 is a block diagram of one embodiment of a processor that includes an instruction fetch engine in accordance with the present invention.

FIG. 3 is a block level diagram of one embodiment of a processor 300 that includes an instruction fetch engine ("IFE") 304 in accordance with the present invention. IFE 304 includes first and second IP sources 310(a) and 310(b), respectively, a thread-arbiter 340, an I-cache 320, and a temporary instruction cache ("TIB") 350. IFE 304 provides instructions to first and second instruction buffers 330(a) and 330(b), respectively, for execution by back-end resources 360.

For one embodiment of processor 300, IP source 310(a) and instruction buffer 330(a) are allocated to a first instruction thread ("thread-A"), and IP source 310(b) and instruction buffer 330(b) are allocated to a second instruction thread ("thread-B"). Thread-arbiter 340, I-cache 320, and TIC 350 are shared by threads A and B. Instructions from one or both threads are issued to back-end resources 360 for execution and retirement. On a context switch, state data for, e.g., thread-A is saved to memory, and the resources relinquished by thread-A, such as IP source 310(a), instruction buffer 310(a), data and control registers (not shown), are allocated to a new thread. In the following discussion, indices are dropped from thread-specific resources, like IP source 310 and instruction buffer 330, except as needed to avoid ambiguity.

Thread-arbiter 340 selects an IP from source 310(a) or 310(b) according to a thread selection algorithm implemented by processor 300, and forwards the selected IP to I-cache 320. Assuming the forwarded IP hits in I-cache 320, a block of thread instructions indicated by the IP is provided to the instruction buffer 330 corresponding to the source 310 of the IP. For example, if arbiter 340 selects the IP from source 310(a) and the selected IP hits in I-cache 320, I-cache 320 outputs a portion of the thread-A instructions indicated by the IP to instruction buffer 330(a). If arbiter 340 implements a round robin thread selection algorithm, an IP from source 310(b) is forwarded to I-cache 320 on the next clock interval. Assuming the IP hits, I-cache 320 outputs a portion of the thread-B instructions indicated by the IP to instruction buffer 330(b).

Regardless of the thread selection algorithm applied by arbiter 340, the multi-threaded nature of processor 300 ensures that instruction buffers 330(a) and 330(b) do not receive instruction blocks from I-cache 320 for their respective threads on every clock interval. In the example described above, instruction buffer 330(a) does not receive thread-A instructions from I-cache 320 on those clock intervals for which I-cache 320 outputs thread-B instructions. To compensate for this, I-cache 320 outputs a number of instructions that exceeds the processing width of processor 300, and temporary instruction cache (TIC) 350 stores a portion of the output thread instructions for delivery when I-cache 320 services the other thread.

For one embodiment of the invention, dual-threaded processor 300 has a processing width of N-instructions, and instruction buffer 330 is designed to receive N instructions per clock interval. For this embodiment, I-cache 320 outputs 2N instructions per clock interval using, for example, a cache line size sufficient to accommodate 2N instructions. During a first clock interval, a first block of N thread-A instructions is provided to instruction buffer 330(a) and a second block of N thread-A instructions is provided to TIC 350. During a second clock interval, first and second blocks of N thread-B instructions are transferred to instruction buffer 330(b) and TIC 350, respectively. During a third clock interval, instruction cache 320 provides new first and second blocks of N thread-A instructions to instruction buffer 330(a) and TIC 350, respectively.

The instruction blocks in TIC 350 are transferred to instruction buffers 330(a) and 330(b) on those clock intervals for which I-cache 320 outputs blocks of instructions for thread-B and thread-A, respectively. In the above example, the second block of N thread-A instructions is transferred from TIC 350 to instruction buffer 330(a) on the second clock interval, and the second block of N thread-B instructions is transferred from TIC 350 to instruction buffer 330(b) on the third clock interval. Proceeding in this manner and ignoring branches for the moment, instruction buffers 330(a) and 330(b) each receive blocks of N instructions per clock interval without the use of multiple ports on I-cache 320. For example, instruction buffer 330(a) receives blocks of N thread-A instructions from I-cache 320 and TIC 350 on the first and second clock intervals, respectively, while instruction buffer 330(b) receives blocks of N thread-B instructions from TIC 350 and I cache 320 on these same clock intervals.

For one embodiment of processor 300, TIC 350 is implemented as a cache shared by thread-A and thread-B. For different embodiments of TIC 350, entries may be allocated to threads as needed, they may include one or more bits to identify a thread to which the associated instructions belong, or they may be partitioned into separate thread-A and thread-B banks. In general, an entry of TIC 350 stores a block of N-instructions, one or more associated address tags, and any ancillary information that may be used by instruction buffers 330 or back-end resources 360. For example, a cache line may have associated memory-type or attribute information used to process its component instructions properly. This information may be temporarily stored in TIC 350, along with the address tag(s) and N-instruction block.

Accesses to TIC 350 may be handled like those to I-cache 320. For one embodiment of processor 300, IP source 310 generates an IP or address tag on each clock interval, and arbiter 340 forwards the generated IPs to I-cache 320 and to TIC 350 on alternating clock intervals. When an IP hits in I-cache 320 on a first clock cycle, the IP sent to TIC 350 on the second clock cycle will hit, provided no resteering events intervene. Resteering events include, for example, branches in the first block of N-instructions that are predicted taken, interrupts and the like. For the system described above, arbiter 340 may forward the IPs generated for thread-A on first and second clock intervals to I-cache 320 and to TIC 350, respectively. The IPs generated for thread-B may be forwarded to TIC 350 and I-cache 320 on the first and second clock intervals, respectively.

TIC 350 may be embodied in a number of different ways. For example, it may by implemented as a virtually addressed cache, a physically addressed cache, a FIFO or some other comparable storage structure.

As long as instructions execute sequentially, TIC 350 allows IFE 304 to provide a steady stream of instructions for multiple instruction threads. For example, if a first instruction block of a cache line is executed, it is likely that the second instruction block will also be executed. Outputting the first and second instruction blocks on the same cache access and temporarily storing the second instruction block to provide to an instruction queue on a later clock interval works well as long as the instructions continue to execute in sequence.

Branches and interrupts can disrupt the sequential execution of instructions by transferring control to a non-sequential target instruction. For example, a cache line to which an IP from, e.g., IP source 310(a) points may include a branch that is predicted "taken" (TK). For one embodiment of processor 300, if a branch that is predicted TK is detected, the next IP provided by IP source 310(a) points to the predicted target address of the branch. If the branch falls within the first N-instructions of the cache line, TIC 350 will hold the next N-instructions in sequence by the time the next IP from thread-A is processed. Since the next IP points to non-sequential block of instructions, this IP will miss in TIC 350. If the branch instruction falls within the last N-instructions of the cache line, the next IP will be applied to I-cache 320, which may or may not contain the branch target instruction(s).

Processors in accordance with the present invention may handle such non-sequential instruction flows in a number of different ways. For example, if the first instruction block includes a branch that is predicted taken, the next IP (pointing to the branch target address) may be preserved until arbiter 340 again selects a thread-A IP for coupling to I-cache 320. For the round-robin algorithm discussed above, this happens two clock intervals after the thread-A IP that points to the branch-containing cache line is provided to I-cache 320. Assuming a cache line that includes the branch target instruction is available in I-cache 320, the next IP will hit in I-cache 320 and instruction fetching can continue down the new branch leg. This and other mechanisms for handling non-sequential instruction flows are discussed below in greater detail.

Figure 4:
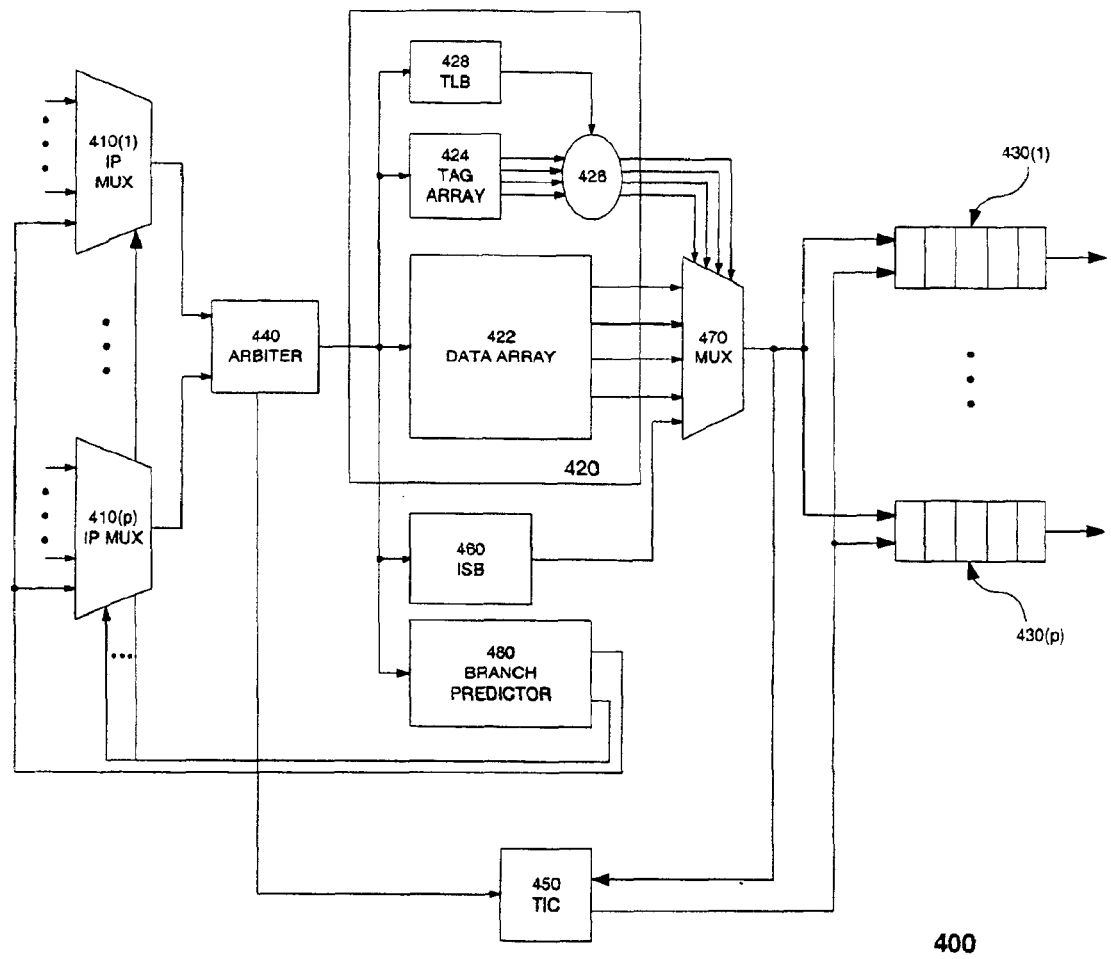
FIG. 4 is a block diagram of another embodiment of a processor that includes an instruction fetch engine in accordance with the present invention.

FIG. 4 is a block diagram representing an embodiment of a processor 400 that includes an instruction fetch engine (IFE) 404 suitable for supporting p-threads concurrently (thread-l to thread-p). IFE 404 includes IP MUXes 410(1)–410(p), which provide IPs for up to p-threads. Arbiter 440 selects an IP for one of the p-threads and forwards it to I-cache 420, instruction streaming buffer (ISB) 460, and branch predictor 480. ISB 460 temporarily stores instructions that are returned (streamed) from memory. A source select MUX 470 provides an instruction block to one of instruction buffers 430(1)–430(p), responsive to an IP from one of corresponding IP MUXs 410(1)–410(p), respectively, hitting in I-cache 420 or ISB 460.

For the disclosed embodiment of IFE 404, I-cache 420 is a four way set-associative cache that includes a data array 420, a tag array 424, a translation look-aside buffer (TLB) 428 and a way selector 426. Various portions of the IP are applied to data array 422, tag array 424 and TLB 428 to determine whether a cache line pointed to by the IP is present in cache 420. Data array 424 stores instructions in cache lines, each of which includes p-blocks of instructions. MUX 470 selects the cache line from an appropriate one of the ways, when an IP hits in I-cache 420. This particular cache configuration is one of many that may be implemented with the present invention and is provided for illustration only.

Branch predictor 480 performs a look-up in response to an IP, to determine whether the IP points to a cache entry that contains a branch instruction. If an IP hits in branch predictor 480, it indicates whether the branch is predicted taken (TK) or not taken (NT). If a branch is predicted TK, branch predictor 480 provides a target IP corresponding to a memory address that includes the instruction to which the branch is predicted to jump. The target IP is routed to the IP MUX that provided the IP that hit in branch predictor 480. For example, if thread_1 provides an IP that hits in branch predictor 480 on a first clock interval, branch predictor 480 provides a target IP for the branch to an input of IP MUX 410(1). Typically, branch predictor 480 also signals IP MUX 410(1) to select the input that corresponds to the branch target IP on the next clock interval.

As noted above, if a branch instruction that is predicted taken occurs in a portion of the cache line other than the last portion, the benefit of storing the next sequence of instructions in TIC 450 is lost. For example, where p=2, and a branch in the first instruction block of a thread-1 cache line is predicted taken, the second instruction block of the cache line is not on the predicted instruction path. For one embodiment of processor 400, branch predictor 480 provides to MUX 410(1) an IP that points to the address of the non-sequential instruction (branch target address).

For the round-robin algorithm discussed above, the next IP is the branch target IP, which is normally sent to TIC 450. For one embodiment of IFE 404, arbiter 440 may skip this step and couple the branch target IP to I-cache 420 the next time thread-1 is given access to I-cache 420. Alternatively, it may couple the branch target IP to TIC 450 on the next clock cycle and recirculate it to I-cache 420 on the following cycle. If the branch target IP is sent to TIC 450, it will likely miss unless there is only a "short" distance between the sequential address and the branch target address. Here, "short means that the branch target falls within the next portion of the cache line, e.g. the portion that is stored in TIC 450. For embodiments of processor 400 that support prefetching, non-sequential IPs have a relatively high probability of hitting in I-cache 420.

Other embodiments of IFE 404 may handle branches in different ways. For example, the transfer of instruction blocks of a cache line to TIC 450 may be canceled if a predicted TK branch is detected in an earlier instruction block and the next IP may default to I-cache 320. For example, in a dual-threaded processor, transfer of the second instruction block may be canceled if a predicted TK branch is detected in the first instruction block. Persons skilled in the art of processor design and having the benefit of this disclosure will recognize other alternatives for handling non-sequential operations.

Figure 5:
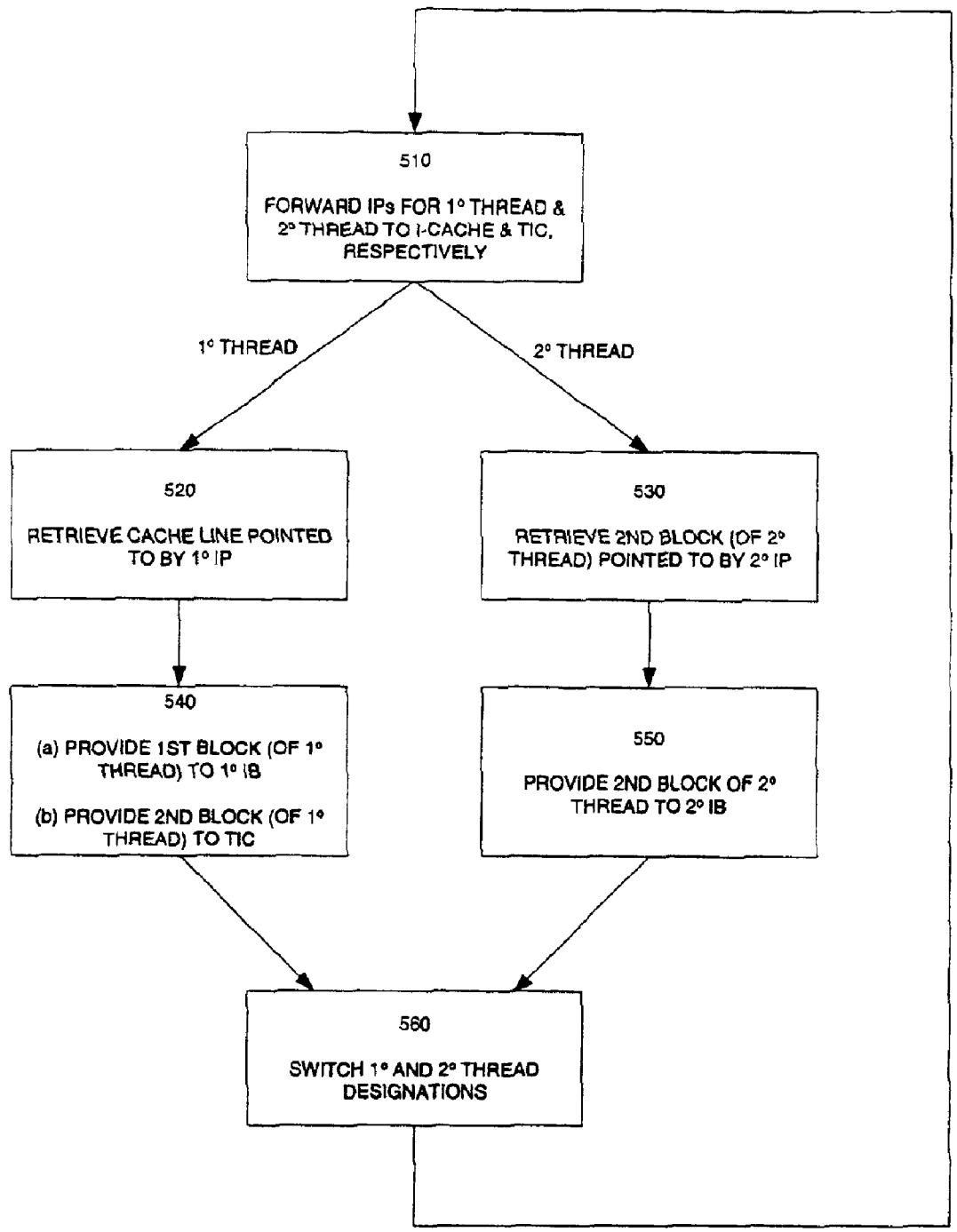
FIG. 5 is a flow chart representing one embodiment of a method for fetching instructions in accordance with the present invention.

FIG. 5 is a flow chart representing one embodiment of a method 500 for fetching instructions in a processor that handles two threads concurrently using a round robin thread selecting algorithm. A thread is designated as primary (1°) or secondary (2°) according to whether its IP is sent to the I-cache or temporary I-cache (TIC), respectively. For this embodiment, a cache line for a given thread includes a first block of instructions and a second block of instructions, and instructions in the first block are executed ahead of instructions in the second block. Thread operations that occur in parallel are indicated by the adjacent paths (designated 1° thread and 2° thread) in FIG. 5.

Initially, IPs for the threads currently designated as primary and secondary are forwarded 510 to the I-cache and to the temporary I-cache, respectively. A cache line of the primary thread ("primary cache line") is retrieved 520 from the I-cache, responsive to the primary IP, and a second instruction block of the secondary thread is retrieved from the TIC 530 responsive to the secondary IP. The first block of the primary cache line is provided 540(a) to the instruction buffer or queue for the primary thread (1° IB), and the second block of the primary cache line is provided 540(b) to the TIC. Concurrently, the second block of a cache line from the secondary thread is provided 550 to the instruction buffer for the secondary thread (2° IB). This block will have been loaded into the TIC on a previous clock interval. The primary and secondary designations for the threads are switched 560 and method 500 is repeated.

There has thus been disclosed a mechanism for supporting high bandwidth instruction fetching in a processor. An instruction fetch engine includes an instruction cache and a temporary instruction cache. The cache lines of the instruction cache are sized to accommodate two or more blocks of instructions, while those of the temporary cache are sized to accommodate one or more blocks of instructions. An arbiter selects one of the threads as the primary thread and forwards an IP for the primary thread to the I-cache. Responsive to an I-cache hit by the primary IP, the I-cache provides a first block of the cache line hit by the primary IP to a first instruction buffer and the second block to the temporary instruction cache. On a subsequent clock interval, the I-cache provides first and second blocks of a cache line hit by an IP from another thread to a second instruction buffer and the temporary instruction cache, respectively, and the temporary instruction cache provides the second block of the primary thread to the first instruction buffer.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A processor comprising:
    first and second instruction pointer (IP) sources to provide IPs for first and second instruction threads, respectively;
    an instruction cache to provide a cache line responsive to an IP;
    a source arbiter to provide an IP from the first or second IP source to the instruction cache;
    an instruction buffer (IB) to receive a first block of the cache line from the instruction cache; and
    a temporary instruction cache (TIC) to receive a second block of the cache line in the same clock cycle, the IB and the TIC receive the first and second blocks of the cache line on a first clock interval, wherein the second block of the cache line is transferred to the IB on a subsequent clock interval, the source arbiter provides IPs from the first and second sources on alternate clock intervals, wherein the IB includes first and second IBs to store instructions from the first and second threads, respectively, and wherein the first IB receives an instruction block from the TIC and the second IB receives an instruction block from the cache on a second clock interval.

2. A processor comprising:
    first and second instruction pointer (IP) sources to provide IPs for first and second instruction threads, respectively;
    an instruction cache to provide a cache line responsive to an IP;
    a source arbiter to provide an IP from the first or second IP source to the instruction cache;
    an instruction buffer (IB) to receive a first block of the cache line from the instruction cache; and
    a temporary instruction cache (TIC) to receive a second block of the cache line in the same clock cycle, wherein the IB comprises first and second IBs and the instruction cache provides instruction blocks to the first and second IBs on adjacent clock cycles, wherein the TIC provides instruction blocks to the first and second IBs on subsequent adjacent clock cycles.

3. An instruction fetch engine comprising:
    an instruction cache to provide a line of instructions in response to an instruction pointer;
    an instruction queue to receive a first block of the instruction line from the instruction cache during a first clock interval; and
    a temporary instruction cache to receive a second block of the instruction line during the first clock interval, wherein the instruction cache stores lines of instructions for first and second instruction threads and the instruction queue includes first and second instruction queues to store blocks of instructions for the first and second instruction threads, respectively, wherein the instruction cache provides first and second blocks of a line of instructions for the first instruction thread to the first instruction queue and the temporary instruction cache, respectively, during the first clock interval, wherein the instruction cache provides first and second blocks of a line of instructions for the second instruction thread to the second instruction queue and the temporary instruction cache, respectively, during a second clock interval.

4. An instruction fetch engine comprising:
    an instruction cache to provide a line of instructions in response to an instruction pointer;
    an instruction queue to receive a first block of the instruction line during a first clock interval; and
    a temporary instruction cache to receive a second block of the instruction line during the first clock interval, wherein the instruction queue includes first and second instruction queues and the instruction cache provides first blocks of instruction lines for the first and second instruction threads to the first and second instruction queues on alternate clock intervals, wherein the instruction queue provides second blocks of the instruction lines for the first and second instruction threads to the temporary instruction cache on subsequent alternate clock intervals.

5. The instruction fetch engine of claim 4, wherein the temporary instruction cache provides the second blocks of the instruction lines for the first and second instruction threads to the first and second instruction queues, respectively, on alternate clock intervals.

6. A method comprising:

selecting first and second cache lines for first and second instruction threads;

providing first and second instruction blocks of the first cache line to a first instruction queue and a temporary instruction cache, respectively, during a first clock interval;

providing first and second instruction blocks of the second cache line to a second instruction queue and the temporary instruction cache, respectively, during a second clock interval, and providing the second block of the first cache line from the temporary instruction cache to the first instruction queue during the second clock interval.

7. The method of claim 6, wherein selecting first and second cache, lines comprises:

receiving instruction pointers for the first and second threads; and providing first and second cache lines responsive to receipt of the instruction pointers for the first and second threads, respectively.

8. The method of claim 7, wherein receiving instruction pointers for the first and second threads comprises receiving instruction pointers for the first and second threads during adjacent clock intervals.

9. The method of claim 8, wherein providing the first and second instruction blocks comprises providing the first and second instruction blocks during adjacent clock intervals.

* * * * *